(12) United States Patent
Ruffa

(10) Patent No.: US 9,984,671 B1
(45) Date of Patent: May 29, 2018

(54) OSMOTIC ACOUSTIC SOURCE

(71) Applicant: Anthony A Ruffa, Hope Valley, RI (US)

(72) Inventor: Anthony A Ruffa, Hope Valley, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days. days.

(21) Appl. No.: 15/713,909

(22) Filed: Sep. 25, 2017

(51) Int. Cl.
*G10K 11/00* (2006.01)
*G10K 11/18* (2006.01)
*G10K 9/12* (2006.01)
*H04R 1/24* (2006.01)
*B06B 1/06* (2006.01)

(52) U.S. Cl.
CPC .......... *G10K 11/008* (2013.01); *B06B 1/0622* (2013.01); *G10K 9/121* (2013.01); *G10K 11/18* (2013.01); *H04R 1/24* (2013.01)

(58) Field of Classification Search
CPC ...... G10K 11/008; G10K 11/18; G10K 9/121; B06B 1/0622
See application file for complete search history.

(56) References Cited

U.S. PATENT DOCUMENTS 3,906,250 A 9/1975 Loeb
8,325,564 B1 * 12/2012 Ruffa ..................... G10K 11/18
367/171

* cited by examiner

*Primary Examiner* — Daniel Pihulic
(74) *Attorney, Agent, or Firm* — James M. Kasischke; Michael P. Stanley

(57) ABSTRACT

An acoustic projector is provided with an enclosure having a semi-permeable membrane on one side. High salinity liquid is injected at the enclosure to increase osmotic pressure. Valves thereafter allow free flooding between the enclosure and surrounding seawater to equalize the pressure. Transient pressure in the enclosure generates a pressure pulse that propagates from the semi-permeable membrane. The timing of the injection by salt jets and the free-flooding valves enables a repeatable acoustic pulse at low frequencies and a determinable upper frequency. If the acoustic projector is mounted to be conformal to the hull of a ship; the acoustic projector includes a free-flowing region on one side of a semi-permeable membrane and valves. When the valves are opened; the other side of the membrane is free-flooded. Salt jets inject high salinity liquid into an enclosure to increase pressure with the result of an acoustic pressure pulse.

9 Claims, 3 Drawing Sheets

US 9,984,671 B1

OSMOTIC ACOUSTIC SOURCE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is an acoustic projector and method of use for generating low-frequency acoustic pulses using acoustic pressure developed by differences in salinity across a semi-permeable membrane.

(2) Description of the Prior Art

Low frequency acoustic sources such as in a range of one to ten Hertz are difficult to achieve. Conventional electroacoustic sources, such as Tonpilz transducers, become so physically large at these frequencies that their use becomes impractical. Also, a common low frequency source, known as a moving coil transducer, has difficulty operating below twenty Hertz—even at dimensions as large as 0.5 meters in height and 0.5 meters in diameter.

It is known that osmotic power can be harvested due to the difference in salinity of two liquids across a semi-permeable membrane. This difference in salinity can be achieved between fresh river water and the saltwater of the ocean. A pilot plant is currently in existence that has a four kilowatt capacity. Such plants are able to generate continuous power of one watt per square meter of membrane. As such, it is conceivable that this power can be harvested to enable a low frequency acoustic source and to fulfill a continuing need for a low-frequency acoustic source that is physically practical in application.

SUMMARY OF THE INVENTION

Accordingly, it is a general purpose and primary object of the present invention to provide a practical low frequency source.

To obtain the object of the present invention, osmotic pressure is applied in which the invention is an acoustic projector that generates acoustic power due to artificially induced transient salinity differences on one side of a semi-permeable membrane and in contact with the seawater of the ocean on the rigid side of a planar enclosure. There is an interior to the enclosure that is either filled with seawater or seawater with additional fluid injected by the salt jets.

The numerous salt jets inject liquid onto the enclosure in which the liquid has a high salinity relative to seawater. The use of the high salinity liquid increases the pressure in the enclosure through osmosis. Valves open at a specified time after the liquid injection to free flood between the enclosure and the surrounding seawater in order to equalize the pressure.

The pressure on the enclosure rises when the salt jets impact the enclosure and then the pressure is reduced to an ambient pressure of the surrounding seawater when the free-flooding valves are opened. As a result, the transient pressure in the enclosure generates a pressure pulse that propagates perpendicular to the semi-permeable membrane.

The ability to precisely control the timing of the salt jets and the free-flooding valves enables a repeatable acoustic pulse at low frequencies. An upper frequency limit is governed by the timing precision associated with the actuation of the salt jets and the free flooding valves.

If the acoustic projector is mounted to be conformal to the hull of a ship or an undersea vehicle; the radiating surface of the acoustic projector is not required to be located on the exterior of the hull. The acoustic projector would include a free-flowing region on one side of a semi-permeable membrane and free-flowing valves. When the free-flowing valves are opened; the other side of the membrane is free-flooded. Salt jets inject liquid into an enclosure. The liquid injection will increase pressure in the enclosure and will lead to a radiated acoustic pressure pulse.

BRIEF DESCRIPTION OF THE DRAWINGS

Other objects, features and advantages of the present invention will be better understood by means of a detailed description of the drawings that illustrate the principles of the present invention in which.

DETAILED DESCRIPTION OF THE INVENTION

Figure 1:
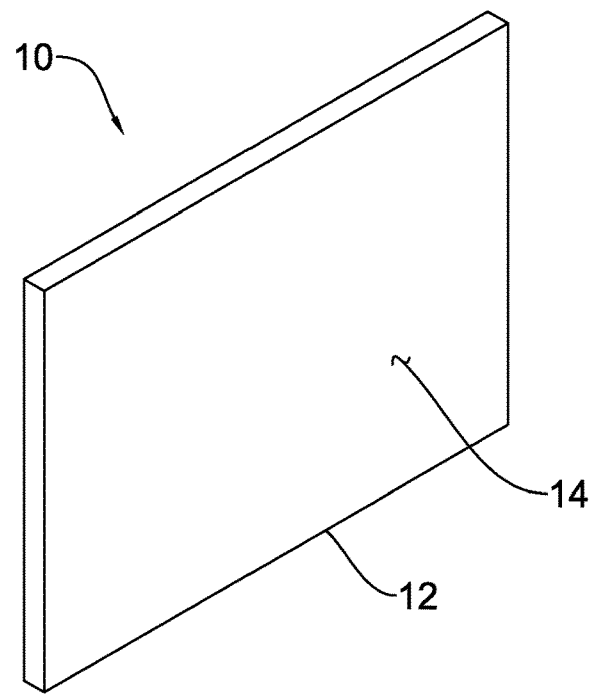
FIG. 1 is an isometric view of an acoustic projector of the present invention.
Figure 2:
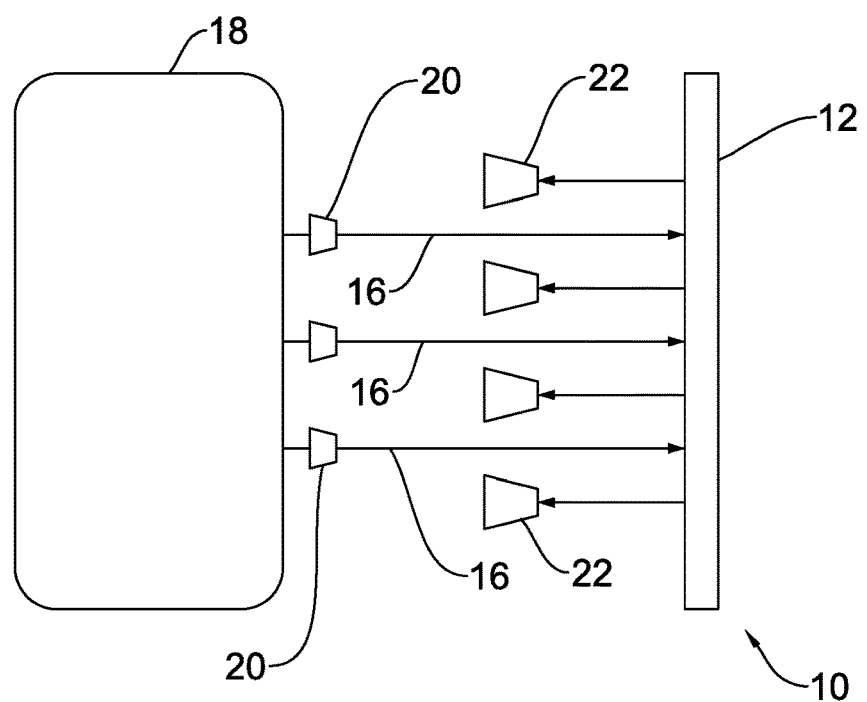
FIG. 2 is a side view of the acoustic projector.

An acoustic projector 10 of the present invention is shown in FIG. 1 and FIG. 2. The acoustic projector 10 comprises an enclosure 12 having a thickness that is small compared to the length and width of the plane of the enclosure that govern the radiating area of the projector.

In one example, the acoustic projector 10 would have a thickness on the order of one centimeter compared to a dimension on one side of the radiating surface that is on the order of one meter the length and width of the plane of the enclosure. The walls of the enclosure 12 are rigid aluminum except for a semi-permeable membrane 14 on one side of the enclosure. The type of membranes used for an osmotic power plant can be used for the semi-permeable membrane 14. This semi-permeable membrane 14 is a thin-film composite having a thin polyamide active layer deposited on a polyethersulfone porous layer supported by a non-woven fabric sheet.

This semi-permeable membrane 14 is in direct contact with surrounding seawater. Salt jets 16 inject liquid 200 in direction "A" into the enclosure 12 in which the liquid has a high salinity relative to seawater. The flow rate of the injection is calculated from the salinity, the volume of the enclosure and the pulse duration of the injection. The salinity can range from the salinity of seawater (i.e., 3.5% by weight) to the salinity limited by the solubility of salt in water (i.e., 36 grams per 20 grams of water at 20 degrees centigrade, or thirty-six percent by weight). The use of the high salinity liquid 200 in this manner increases the pressure in the enclosure 12 through osmosis.

A pressurized high salinity liquid reservoir 18 is provided such that the high salinity liquid 200 can be injected by opening a valve 20 controlling each salt jet 16. The salinity of the liquid 200 in the reservoir 18 would be substantially greater than three and a half percent by mass (which is the average salinity of the ocean). A sensing system could be added to measure the acoustic pressure in the enclosure 12 and control the valves 20 to increase or decrease the flow rate, as needed.

Free flooding valves 22 open at a specified time after the injection of the liquid 200 to allow free flooding between the enclosure 12 and the surrounding seawater in order to equalize the pressure with that of the surrounding seawater. For example, in order to generate a one second pressure pulse; the free flooding valves 22 are timed to actuate and open one second after the high salinity liquid 200 is injected with the specified time being equal to the duration of the pressure pulse. The valves 22 have electric actuators powered by electrical conductors (not shown).

Figure 3:
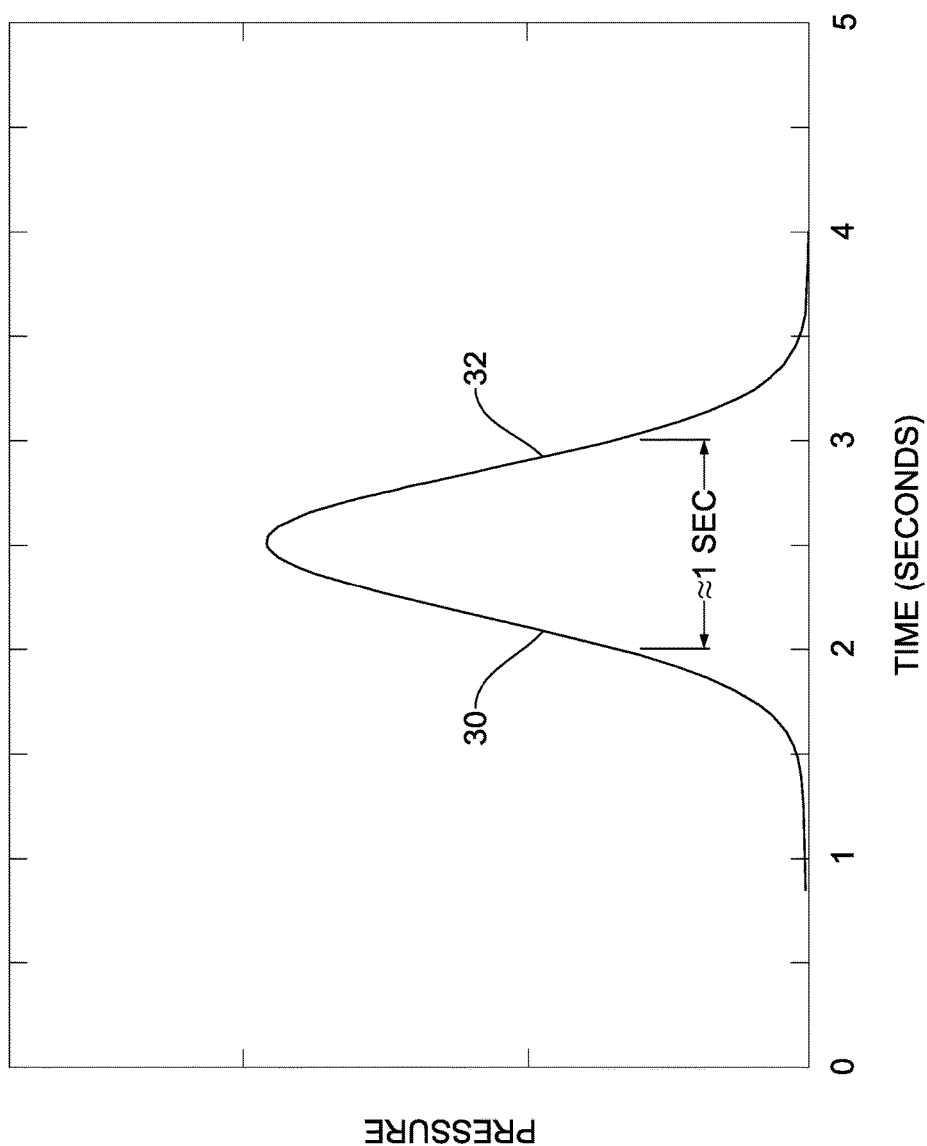
FIG. 3 is a graphical representation of the pressure changes in salinity in liquid during the use of the acoustic projector.

The pressure on the enclosure 12 rises when the salt jets 16 are introduced and then the pressure is reduced to an ambient pressure when the valves 22 are opened. The valves 22 would be in contact with on one of the rigid surfaces on the enclosure 12. See FIG. 3 for a graphical representation of the pressure changes.

In the figure, the pressure rises after salt jets are activated as indicated by label 30 and the pressure falls after free flooding valves are opened as indicated by label 32. The peak pressure should correspond to a peak acoustic source level of 171.5 decibels, which would correspond to the example herein. For example: a one square meter membrane with a salinity difference of three and a half percent generates one watt of power which leads to an acoustic source level of 171.5 decibels. That source level corresponds to an acoustic pressure of 3780 Pa.

As a result, the transient pressure in the enclosure 12 generates a pressure pulse that propagates perpendicular to the semi-permeable membrane 10. Furthermore, the pressure pulse is greater than the ambient pressure. This is a unique feature relative to other acoustic sources in which those other sources can generate only a zero mean acoustic pressure.

The acoustic projector 10 of the present invention represents a fundamentally different mechanism for generating acoustic pressure. As a result, the acoustic projector 10 reduces or eliminates the potential for acoustic cavitation. Conventional sources generate an acoustic signal via mechanical oscillation. In other words, the conventional sources involve an oscillating surface in contact with water. Such a surface must generate a zero mean acoustic pressure.

A zero mean acoustic pressure places an inherent limit on the amplitude because a zero mean generates both positive and negative acoustic pressures that are equal. Cavitation will occur when the negative pressure exceeds the hydrostatic pressure. For example, if the hydrostatic pressure at the transducer location is two atmospheres; the acoustic pressure amplitude that is generated cannot exceed two atmospheres without inducing cavitation.

The pulses generated by the acoustic projector 10 approximate a Gaussian waveform rather than a zero-mean modulated sinusoidal waveform. Such a waveform has the potential for an improved distinguishing capability when using a matched filter. For example: the cross-correlation between a sent signal and the return of the signal (which is a time-shifted version of the sent signal, usually with a smaller amplitude).

Since the cross-correlation between a Gaussian signal and a sinusoid signal (representing noise) is very low; the output of the matched filter has the potential for a high signal-to-noise ratio compared to a conventional pulse (which also consists of a modulated sinusoidal waveform). For a conventional pulse, the matched filter gain is proportional to the signal bandwidth to distinguish the matched filter gain from noise since both the signal and noise have a sinusoidal nature.

The ability to precisely control the timing of the salt jets 16 and the free-flooding valves 22 enables a repeatable acoustic pulse at low frequencies with only large surfaces, not necessarily large volumes. If a tenth of a second pulse is needed then the free flooding valves 22 would be timed to open after a tenth of a second after the introduction of the salt jets 16. The introduction of the salt jets 16 and the opening of the valves 22 after 0.1 seconds will lead to substantial acoustic energy projected at ten Hertz. A substantial amount of acoustic energy would be projected at other pulse durations.

The upper frequency limit is governed by the timing precision associated with the actuation of the salt jets 16 and the free flooding valves 22. The upper frequency limit is also governed by the diffusion time associated with the enclosure 12 but the upper frequency limit can be reduced be reducing the thickness of the enclosure. Projecting acoustic power at higher frequencies is not as critical. There are many other known methods to accomplish this. It is much more difficult to project substantial acoustic power at low frequencies.

Low frequency acoustic pulses are typically used for long range sonar range operations (for example, 15000 meters and longer). This means that the two-way travel time is typically at least twenty seconds. Twenty seconds is enough time for the free flooding valves 22 to open and equalize the pressure and the salinity before the next acoustic pulse is generated.

A one square meter membrane with a salinity difference of three and a half percent can generate one Watt of power which leads to an acoustic source level of 171.5 decibels. However, this acoustic source level can be increased by at least ten to twenty decibels by increasing the difference in salinity (artificially by ten percent or more) and/or the area of the enclosure 12. Seawater typically has a salinity of three and a half percent by mass.

Figure 4:
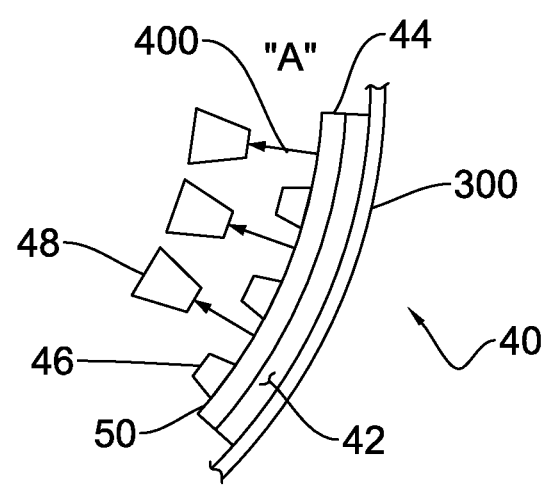
FIG. 4 depicts a variation of the acoustic projector of the present invention in a side view with the projector used on the hull of a ship.

If the acoustic projector 10 is mounted to conform to the hull of a ship or to an undersea vehicle; the radiating surface of the acoustic projector is not required to be located on the exterior of the hull. FIG. 4 depicts an acoustic projector 40 which is located on the interior of the hull 300.

In the figure, the acoustic projector 40 includes a free-flowing region 42 on one side of a semi-permeable membrane 44 and free-flowing valves 46. When the free-flowing valves 46 are opened; the other side of the membrane 44 is free-flooded. Salt jets 48 inject liquid 400 in direction "A" into an enclosure 50 with the liquid having a high salinity relative to sea water. The liquid injection increases pressure in the enclosure 50 and produces a radiated acoustic pressure pulse. At low frequencies, the sound transmits through the hull 300 with a negligible insertion loss because the thickness of the hull is a fraction of the acoustic wavelength. This approach will not expose the membrane 44 to environmental factors external to the hull 300 which can cause damage to the membrane.

An advantage of the acoustic projector 10 is the avoidance of cavitation since only positive acoustic pressure pulses are generated. The acoustic projector 10 also has the potential for an improved discrimination against noise because the acoustic pulse generated does not have a zero mean sinusoidal nature.

Alternatives to the acoustic projector 10 of the present invention include deployment on the sea floor in strategic areas to provide a useful low-frequency source. Also, the acoustic projector 10 may be useful for seismic applications because of a low frequency nature and a waveform that is resistant to noise.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An acoustic projector comprising:
   an enclosure with a thickness, said enclosure having a first planar side and a second planar side;
   a planar semi-permeable membrane affixed to the first planar side of said enclosure; and
   a plurality of salt jets are positioned in proximity to a side of said planar semi-permeable membrane opposite to a side where said semi-permeable membrane is affixed to the first planar side of said enclosure wherein said salt jets are capable of injecting a high salinity liquid into said semi-permeable membrane;
   wherein said second planar side is exposable to seawater and wherein transient pressure in the enclosure after the injection of the high salinity liquid, generates a pressure pulse that propagates perpendicular to the semi-permeable membrane.

2. The acoustic projector in accordance with claim 1, further comprising a pressurized reservoir of high salinity liquid fluidly connected to each of said salt jets.

3. The acoustic projector in accordance with claim 2, further comprising a plurality of valves fluidly connected to said reservoir and said salt jets with each of said valves positioned between said reservoir and each of said salt jets such that the high salinity liquid can be injected by opening each of said valves controlling each of said salt jets.

4. The acoustic projector in accordance with claim 3, in which the pulses generated by the acoustic projector approximate a Gaussian waveform.

5. The acoustic projector in accordance with claim 4, wherein said enclosure has a thickness of one centimeter.

6. The acoustic projector in accordance with claim 5, wherein the salinity of the high salinity liquid is greater than three and a half percent by mass.

7. The acoustic projector in accordance with claim 6, said acoustic projector further comprising a plurality of free flooding valves fluidly connected to said enclosure wherein said free-flooding valves are capable of opening at a specified time after the injection of the high salinity liquid to allow free flooding between said enclosure and the surrounding seawater in order to equalize the pressure.

8. The acoustic projector in accordance with claim 7, wherein a timing of said salt jets said free-flooding valves can be controlled to enable a repeatable acoustic pulse at a low frequency.

9. An acoustic projector comprising:
   an enclosure with a thickness with said enclosure having a first planar side and a second planar side;
   a planar semi-permeable membrane affixed to the first planar side of said enclosure;
   a plurality of salt jets are positioned in proximity to a side of said planar semi-permeable membrane opposite to a side where said semi-permeable membrane is affixed to the first planar side of said enclosure wherein said salt jets are capable of injecting a high salinity liquid into said semi-permeable membrane;
   a plurality of free-flooding valve fluidly connected to said planar semi-permeable membrane wherein said free-flooding valves are capable of flooding the high-salinity fluid from the enclosure to surrounding seawater;
   wherein said second planar side is exposable to the seawater and wherein transient pressure in the enclosure after the injection of the high salinity liquid and the free-flooding by said free-flooding valves generates a pressure pulse that propagates perpendicular to the semi-permeable membrane.

\* \* \* \* \*